(12) United States Patent
Suzuki et al.

(10) Patent No.: US 7,964,827 B2
(45) Date of Patent: Jun. 21, 2011

(54) LAMINATED SHEET HEATER, LAMINATED SHEET HEATER WITH LEAD WIRE, BATTERY STRUCTURE WITH HEATER, AND HEATER UNIT

(75) Inventors: Masahiko Suzuki, Hoi-gun (JP); Naoki Fukusako, Toyohashi (JP); Shuhei Marukawa, Toyohashi (JP); Yukie Uemura, Toyohashi (JP); Kunio Kanamaru, Okazaki (JP)

(73) Assignee: Panasonic Corporation Co., Ltd., Kosai-shi (JP)

( * ) Notice: Subject to any disclaimer, the term of this patent is extended or adjusted under 35 U.S.C. 154(b) by 692 days.

(21) Appl. No.: 12/007,832

(22) Filed: Jan. 16, 2008

(65) Prior Publication Data
US 2008/0179315 A1 Jul. 31, 2008

(30) Foreign Application Priority Data
Jan. 26, 2007 (JP) .................. 2007-016791

(51) Int. Cl.
*H05B 3/34* (2006.01)
*H05B 3/00* (2006.01)
(52) U.S. Cl. ........ 219/549; 219/211; 219/212; 219/529; 219/217; 219/538; 219/544; 219/545
(58) Field of Classification Search ............ 219/211–12, 219/528–9, 217, 538, 544–5, 549
See application file for complete search history.

(56) References Cited

U.S. PATENT DOCUMENTS
7,560,671 B2 * 7/2009 Wheeler et al. ............... 219/538

FOREIGN PATENT DOCUMENTS
JP A-08-162259 6/1996

OTHER PUBLICATIONS

"Outline of heater products" from the website of KURABE Industrial Co., Ltd. and English-language translation of the same, Obtained from (http://www.kurabe.co.jp/Japanese/product/heater/heat.htm), Jan. 1, 2005.

* cited by examiner

*Primary Examiner* — Shawntina Fuqua
(74) *Attorney, Agent, or Firm* — Oliff & Berridge, PLC

(57) ABSTRACT

There is provided a laminated sheet heater whose mounting space is small, a lead wire-equipped laminated sheet heater that requires only a small mounting space and provides high reliability of electrical connection between a heater element and a lead wire, a heater-equipped battery structure provided with the laminated sheet heater or the lead wire-equipped laminated sheet heater, and a heater unit. In a first lead wire-equipped laminated sheet heater, a foil heater element includes a heater terminal portion protruding into a film void part in a planar direction of a laminated sheet heater. A lead core wire of a lead wire includes a lead terminal portion crimp-connected to a heater terminal portion by a crimping member so that the lead core wire is placed in contact with the surface of the heater terminal portion within a film void part in the planar direction of the laminated sheet heater.

17 Claims, 13 Drawing Sheets

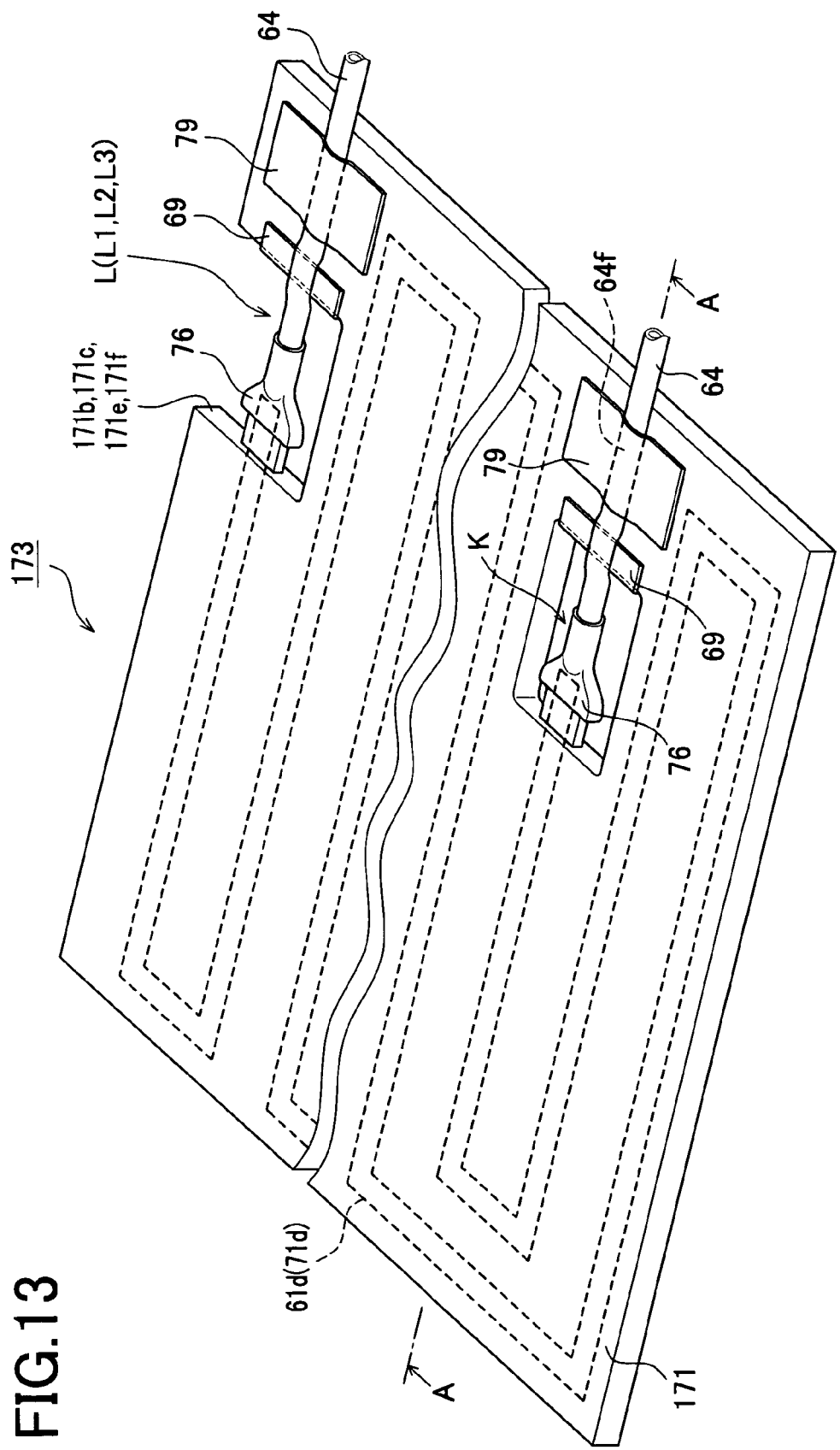

LAMINATED SHEET HEATER, LAMINATED SHEET HEATER WITH LEAD WIRE, BATTERY STRUCTURE WITH HEATER, AND HEATER UNIT

BACKGROUND OF THE INVENTION

1. Field of the Invention

The present invention relates to a laminated sheet heater, a laminated sheet heater with lead wire including the laminated sheet heater and a lead wire electrically connected to a heater element of the laminated sheet heater, a battery structure with heater including the laminated sheet heater or the laminated sheet heater with lead wire, and a heater unit.

2. Description of Related Art

Heretofore, various types have been proposed as a laminated sheet heater having a heater element and a laminated sheet heater with lead wire (hereinafter, referred to as a "lead wire-equipped laminated sheet heater") including a lead wire electrically connected to the heater element (see for example JP8 (1996)-162259A and "Outline of heater products" on a website of KURABE Industrial Co., Ltd., (http://www.kurabe.co.jp/japanese/product/heater/heat.htm).

JP '259A shows, as a prior art, a lead wire-equipped laminated sheet heater in which a cylindrical metal grommet that is placed through the laminated sheet heater in its thickness direction and is electrically connectable to the heater element. The lead wire is inserted through the cylindrical metal grommet and soldered thereto to be connected to the heater element.

Further, JP '259A indicates, as a preferred embodiment, a lead wire-equipped laminated sheet heater in which a base film (an insulating resin film) is formed with an opening, through which part of a heater element (a connecting terminal portion) is drawn from the back side of the laminated sheet heater to the outside in the thickness direction, and a connecting terminal portion of the heater element is connected to a lead wire in a place outside of the back side of the laminated sheet heater in the thickness direction.

The KURABE's website discloses a lead wire-equipped laminated sheet heater in which a heater element and a lead wire is connected outside of the laminated sheet heater in its planar direction parallel to the surface of the heater.

BRIEF SUMMARY OF THE INVENTION

Recently, there is an increasing demand for reducing a mounting space of a laminated sheet heater and a lead wire-equipped laminated sheet heater. Specifically, for instance, a technique of heating a secondary battery serving as a power source of hybrid electric vehicles, electric vehicles, and others by use of the laminated sheet heater and lead wire-equipped laminated sheet heater has been developed in recent years. The hybrid electric vehicles and others have a large limitation in mounting space for the laminated sheet heater and the lead wire-equipped laminated sheet heater. Thus, a laminated sheet heater and a lead wire-equipped laminated sheet heater are required to be smaller in mounting space.

However, in the lead wire-equipped laminated sheet heater shown in the KURABE's website, a connection part between a heater element and a lead wire protrudes outside of the outer periphery of the laminated sheet heater in its planar direction. Accordingly, the mounting space of the lead wire-equipped laminated sheet heater would be large in the planar direction of the laminated sheet heater.

In the lead wire-equipped laminated sheet heater in the prior art mentioned in JP '259A, including the metal grommet inserted through the laminated sheet heater in its thickness direction, a thick reinforcing plate is laminated on the back side of the laminated sheet heater to reinforce the laminated sheet heater. Thus, the thickness of the lead wire-equipped laminated sheet heater is increased, requiring a mounting space larger in the thickness direction. Further, the configuration that a foil heater element and the lead wire are connected through the metal grommet inserted through the laminated sheet heater in its thickness direction and a solder connection part could not be said to be a high reliable connecting configuration. In the case where the lead wire-equipped laminated sheet heater is installed in a hybrid electric vehicle or the like, for instance, the heater is subjected to vibrations for a long term and thus cracks or the like may be caused in the solder connection portion.

In the lead wire-equipped laminated sheet heater disclosed in the preferred embodiment in JP '259A, the connecting terminal portion of the foil heater element is connected to the lead wire in the place outside the back side of the laminated sheet heater in the thickness direction. In addition, as with the prior art mentioned in JP '259A, the thick reinforcing plate is laminated on the back surface of the connecting terminal portion in order to connect the connecting terminal portion of the foil heater element to the lead wire through the metal grommet and the solder connection portion. Therefore, the connection portion between the connecting terminal portion of the foil heater element and the lead wire largely protrudes outward in the thickness direction, leading to a larger mounting space in the thickness direction of the laminated sheet heater. As with the above prior art, the configuration that the connecting terminal portion of the foil heater element and the lead wire are connected through the metal grommet and the solder connection portion could not be said to be a high reliable connecting configuration.

BRIEF SUMMARY OF THE INVENTION

The present invention has been made in view of the above circumstances and has an object to provide a laminated sheet heater requiring only a small mounting space, a lead wire-equipped laminated sheet heater requiring only a small mounting space and providing high reliability in electrical connection between a heater element and a lead wire, a battery structure with heater including the laminated sheet heater or the lead wire-equipped laminated sheet heater, and a heater unit.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a laminated sheet heater including: a first insulating resin film; a second insulating resin film; a heater element interposed between an inner surface of the first insulating resin film and an inner surface of the second insulating resin film; and a film void part defined by one of a film through hole formed through at least one of the first and second insulating resin films and a film recess formed inward in at least one of the first and second insulating resin films in a planar direction of the laminated sheet heater, wherein the heater element includes a heater terminal portion connectable to a lead wire through which electric current can be conducted to the heater element, the heater terminal portion being formed protruding into the film void part in the planar direction.

In the laminated sheet heater of the present invention, the heater element includes the heater terminal portion connectable to the lead wire through which electric current is conducted to the heater element, the heater terminal portion being formed protruding into the film void part in the planar direction. Specifically, the heater terminal portion of the heater element is placed in the inside of the film void part in the planar direction of the laminated sheet heater. Accordingly, a smaller mounting space of the laminated sheet heater in at least the planar direction of the laminated sheet heater can be achieved.

Here, the "inside of the film void part in the planar direction of the laminated sheet heater" also includes the inside of an imaginary region including a space imaginarily extending in a direction of the thickness of the laminated sheet heater (in a lamination direction) as well as the inside of the film void part. In other words, the lead wire-equipped laminated sheet heater of the present invention includes a configuration that the heater terminal portion is received within the film void part and also another configuration that part of the heater terminal portion is received within the film void part. Further, the present invention also includes a laminated sheet heater arranged such that the entire heater terminal portion is positioned outside the film void part but placed within the imaginary region.

In the above laminated sheet heater, the heater terminal portion is preferably placed in the film void part.

In any one of the above laminated sheet heaters, preferably, the heater element is a foil heater element made of metal foil in one of a band shape and a sheet shape.

According to another aspect, the present invention provides a laminated sheet heater with lead wire including: a laminated sheet heater according to claim 1; and the lead wire including a lead core wire that is electrically connected to the heater element through the heater terminal portion; wherein the lead core wire of the lead wire includes a lead terminal portion that is crimp-connected to the heater terminal portion by a crimping member so that the lead terminal portion is in close contact with a surface of the heater terminal portion in the inside of the film void part in the planar direction.

In the lead wire-equipped laminated sheet heater of the present invention, the lead core wire of the lead wire includes the lead terminal portion crimp-connected to the heater terminal portion by the crimping member so that the lead core wire is placed in contact with the surface of the heater terminal portion in the inside of the film void part in the planar direction of the laminated sheet heater. In other words, the heater terminal portion of the heater element is connected to the lead terminal portion of the lead wire (the lead core wire) within the film void part in the planar direction of the laminated sheet heater.

As above, connecting of the heater terminal portion and the lead terminal portion within the film void part in the planar direction of the laminated sheet heater allows a connection part between the heater terminal portion and the lead wire to be placed inside of the laminated sheet heater. Accordingly, a smaller mounting space of the lead wire-equipped laminated sheet heater in the planar direction of the laminated sheet heater can be achieved.

As mentioned above, the "inside of the film void part in the planar direction of the laminated sheet heater" includes the inside of the imaginary region including a space imaginarily extending in the thickness direction of the laminated sheet heater, besides the inside of the film void part. In other words, the lead wire-equipped laminated sheet heater of the present invention includes a configuration that a connection part between the heater terminal portion and the lead terminal portion crimp-connected by the crimping member (hereinafter, referred to as a "crimp-connection part") is placed in the inside the film void part and besides another configuration that part of the crimp-connection part is placed in the inside of the film void part. Further, the present invention includes a lead wire-equipped laminated sheet heater arranged such that the entire crimp-connection part is positioned outside the film void part but placed within the imaginary region.

In the lead wire-equipped laminated sheet heater of the present invention, the lead terminal portion is crimp-connected to the heater terminal portion by the crimping member so that the lead terminal portion is placed in contact with the surface of the heater terminal portion. With such connecting configuration, the electrical connection between the lead terminal portion and the heater terminal portion can be maintained stably for a long term even under an environment susceptible to vibration, leading to high reliability of the electrical connection between the heater element and the lead wire.

Such connecting configuration also allows a reduction in thickness of the entire connection part as compared with the configuration in which a thick reinforcing plate is laminated on a back surface of the connecting terminal portion to connect the connecting terminal portion of the heater element to the lead wire with a metal grommet and a solder connection part (see the aforementioned explanation related to JP8 (1996)-162259A). This makes it possible to achieve a smaller mounting space of the lead wire-equipped laminated sheet heater in the thickness direction of the laminated sheet heater.

The crimping member may be any configuration if only it is plastic deformable itself to hold the lead terminal portion and the heater terminal portion in a crimp-connecting state. For example, it may be a cylindrical crimp-connector (e.g., P-type crimp-connector made by J.S.T Mfg. Co. Ltd.).

In the lead wire-equipped laminated sheet heater, preferably, the lead terminal portion and the heater terminal portion are placed within the film void part.

Further, in any one of the lead wire-equipped laminated sheet heaters, preferably, the laminated sheet heater includes at least one of a first metal sheet laminated on an outer surface of the first insulating resin film and a second metal sheet laminated on an outer surface of the second insulating resin film, the film void part is covered by the first metal sheet from above the outer surface of the first insulating resin film or by the second metal sheet from above the outer surface of the second insulating resin film.

Preferably, in any one of the lead wire-equipped laminated sheet heaters, the laminated sheet heater includes at least one of a first metal sheet laminated on an outer surface of the first insulating resin film and a second metal sheet laminated on an outer surface of the second insulating resin film, at least one of the first metal sheet and the second metal sheet is provided with a metal-sheet void part defined by one of a metal-sheet through hole formed through the first or second metal sheet and a metal-sheet recess formed inward in the planar direction of the laminated sheet heater, and the metal-sheet void part being configured to be continuous with the film void part so that the lead wire is inserted through the metal-sheet void part, and a metal-sheet corner portion formed between the outer surface of the first or second metal sheet and an inner peripheral surface defining the metal-sheet void part is covered by a protective member having a smooth outer surface.

In any one of the lead wire-equipped laminated sheet heaters, preferably, at least part of a crimp-connection part in which the heater terminal portion and the lead terminal portion are crimp-connected to each other by the crimping member is placed in the inside of the film void part.

In any one of the lead wire-equipped laminated sheet heaters, preferably, at least part of a crimp-connection part in which the heater terminal portion and the lead terminal portion are crimp-connected to each other by the crimping member is placed in the inside of at least one of the film void part and the metal-sheet void part.

Furthermore, in any one of the lead wire-equipped laminated sheet heaters, preferably, at least part of the crimp-connection part in which the heater terminal portion is crimp-connected to the lead terminal portion by the crimping member is placed within the heater void part formed of the film void part or a combination of the film void part and the metal-sheet void part.

Furthermore, in the lead wire-equipped laminated sheet heater, preferably, the crimp-connection part is placed within the heater void part.

In any one of the lead wire-equipped laminated sheet heaters, preferably, at least part of the lead wire is fixed to an outermost surface of the laminated sheet heater.

In the lead wire-equipped laminated sheet heater, preferably, the lead wire includes an adjacent lead portion located adjacent to the lead terminal portion, and at least the adjacent lead portion is fixed to the outermost surface of the laminated sheet heater.

In any one of the lead wire-equipped laminated sheet heaters, preferably, at least part of the lead wire is fixed to the outermost surface of the laminated sheet heater by a fixing member, and the fixing member covers the film void part together with a crimp-connection part in which the heater terminal portion and the lead terminal portion are crimp-connected to each other by the crimping member, from above the outermost surface of the laminated sheet heater.

It is to be noted that the fixing member may include a metal film having an adhesive layer, a resin film having an adhesive layer, and a glass cloth having an adhesive layer.

In any one of the lead wire-equipped laminated sheet heaters, preferably, at least part of the lead wire is fixed to the outermost surface of the laminated sheet heater by a fixing member, and the fixing member covers the film void part and the metal-sheet void part together with a crimp-connection part in which the heater terminal portion and the lead terminal portion are crimp-connected to each other by the crimping member, from above the outermost surface of the laminated sheet heater.

In any one of the lead wire-equipped laminated sheet heaters, preferably, at least part of the lead wire is fixed to the outermost surface of the laminated sheet heater by the fixing member, and the fixing member covers the heater void part formed of the film void part or a combination of the film void part and the metal-sheet void part, from above the outermost surface of the laminated sheet heater, together with the crimp-connection part in which the heater terminal portion is crimp-connected to the lead terminal portion by the crimping member.

According to another aspect, furthermore, the present invention provides A battery structure with heater comprising: a battery structure that includes a power generating element and has a surface to be heated; and a heater for heating the surface to be heated to heat the power generating element, wherein the heater is the aforementioned laminated sheet heater.

The battery structure with heater (hereinafter, referred to as a "heater-equipped battery structure") of the present invention includes any one of the above laminated sheet heaters or any one of the lead wire-equipped laminated sheet heaters. Any laminated sheet heaters and lead wire-equipped laminated sheet heaters mentioned above need only a small mounting space, leading to a small mounting space of the heater-equipped battery structure of the present invention.

Furthermore, the above lead wire-equipped laminated sheet heaters can provide high reliability of electrical connection between the heater element and the lead wire. In the heater-equipped battery structure of the present invention, accordingly, the power generating element of the battery structure can be heated appropriately by the lead wire-equipped laminated sheet heater.

The battery structure may include a cell arranged such that a single power generating element is housed in a battery case, for example. It may include a battery module including a battery case provided with a plurality of compartments each integrally formed to individually house power generating elements, and the power generating elements housed in the compartments respectively. Further, it may include a battery pack in which a plurality of cells or battery modules connected in series or in parallel is held in a casing, a holder frame, or the like.

The power generating element is a constituent element of a battery for providing battery functions (charge, discharge, etc.). It includes for example a positive electrode plate, a negative electrode plate, a separator, and an electrolyte.

According to another aspect, furthermore, the present invention provides a heater unit comprising: a heater; and a holding member that holds the heater; the heater unit being arranged to heat the battery structure to heat the power generating element, wherein the heater is the aforementioned laminated sheet heater, and the holding member is configured to attach the heater unit to the battery structure.

The heater unit of the present invention includes any one of the above laminated sheet heaters or any one of the above lead wire-equipped laminated sheet heaters. Any laminated sheet heaters and lead wire-equipped laminated sheet heaters mentioned above need only a small mounting space, leading to a small mounting space of the heater unit of the present invention.

Furthermore, the above lead wire-equipped laminated sheet heaters can provide high reliability of electrical connection between the heater element and the lead wire. Accordingly, the use of the heater unit of the present invention allows appropriate heating of the power generating element of the battery structure.

In the above heater unit, preferably, the holding member is configured to attach or detach the heater unit with respect to the battery structure.

The use of this heater unit can facilitate detachment of the heater unit even after the heater unit is attached to the battery structure. Thus, workability of the laminated sheet heater and the lead wire-equipped laminated sheet heater in maintenance or other works can be improved.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 13 is a perspective view of a lead wire-equipped laminated sheet heater of a second modified example.

DETAILED DESCRIPTION OF THE PREFERRED EMBODIMENTS

A detailed description of a preferred embodiment of a heater-equipped battery structure 10 embodying of the present invention will now be given referring to the accompanying drawings.

Figure 1:
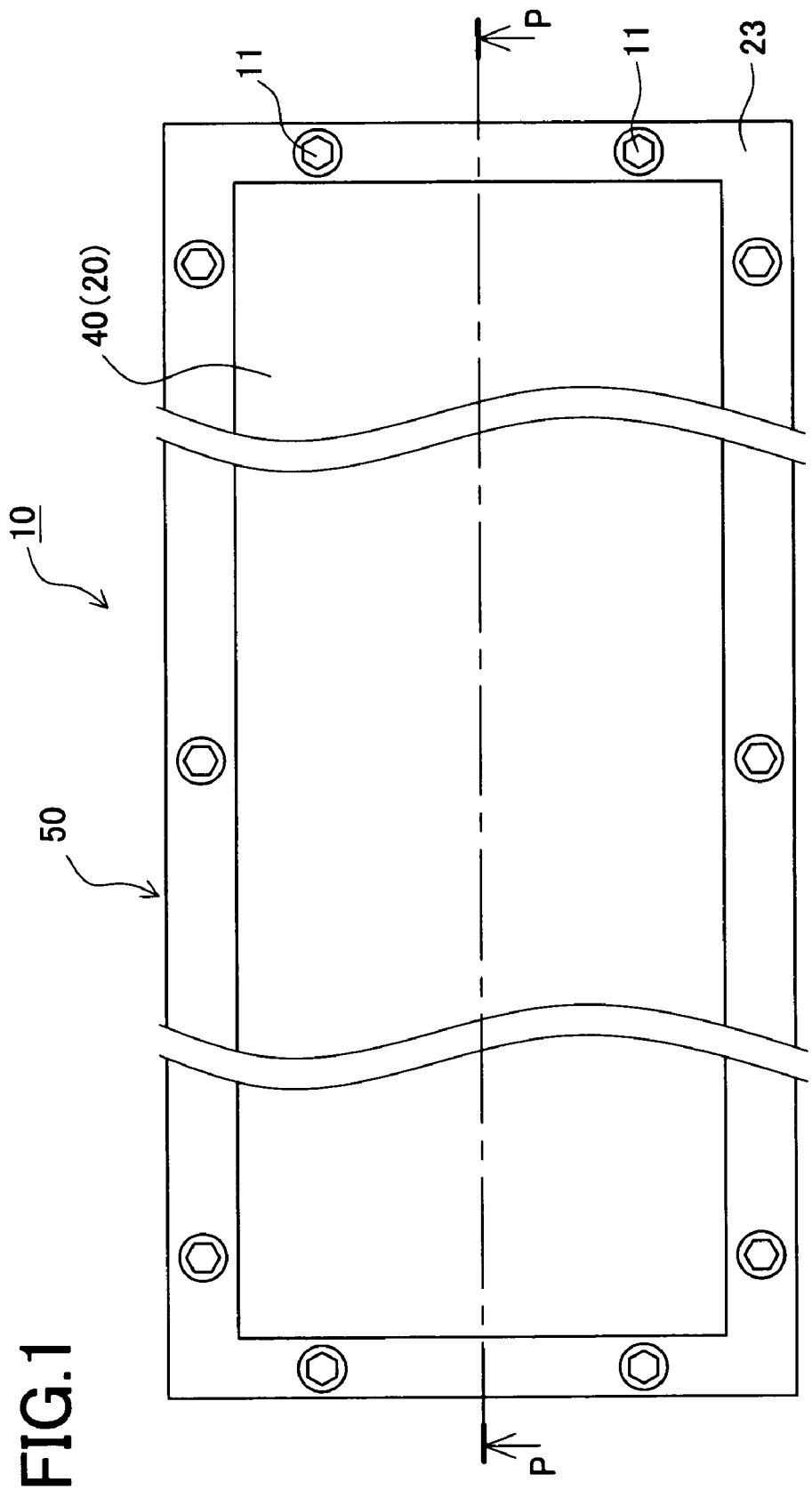
FIG. 1 is a top view of a heater-equipped battery structure of a preferred embodiment.
Figure 2:
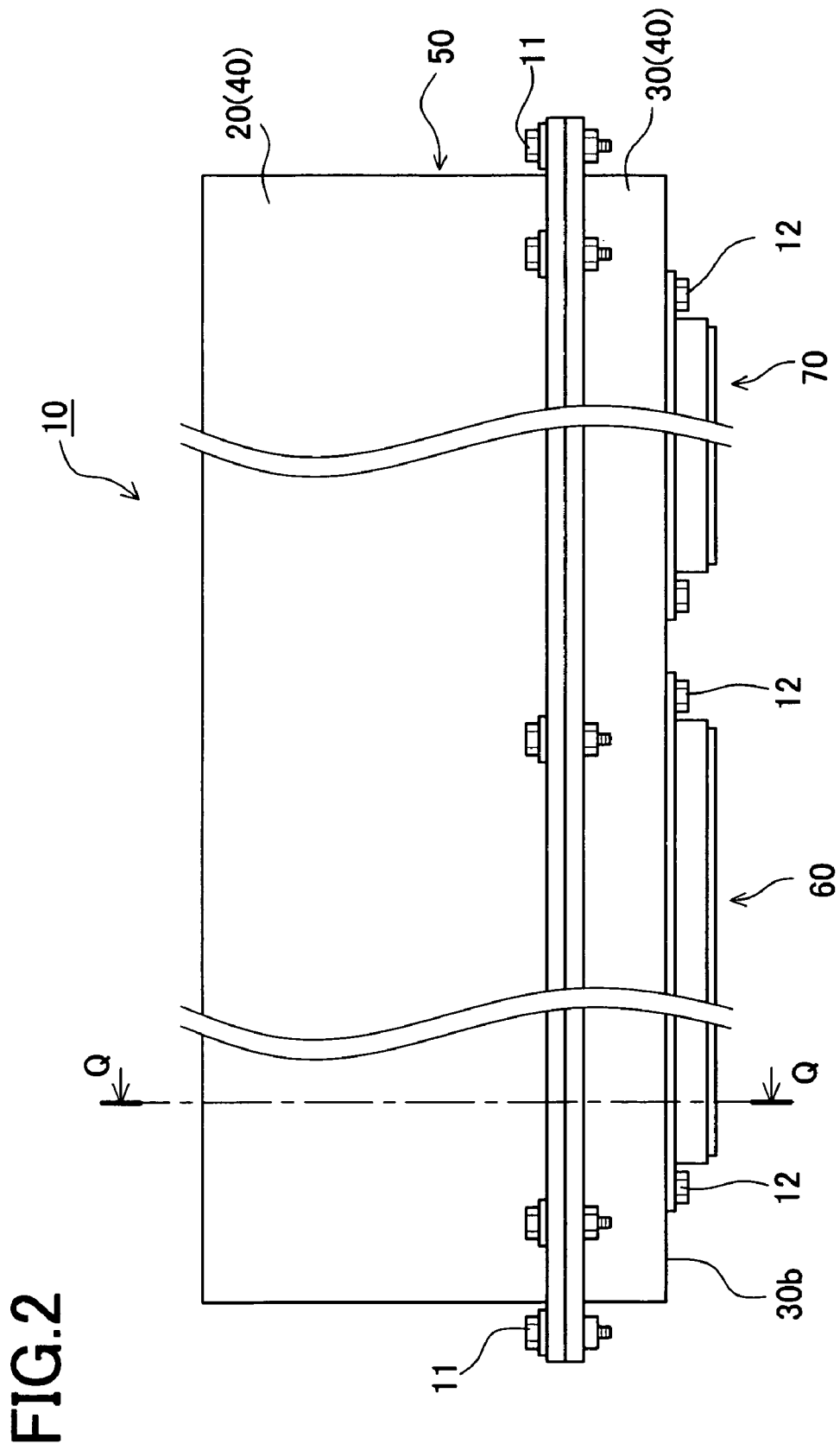
FIG. 2 is a side view of the heater-equipped battery structure of the embodiment.

The heater-equipped battery structure 10 includes a battery pack 50, a first heater unit 60, and a second heater unit 70 as shown in FIGS. 1 and 2.

Figure 3:
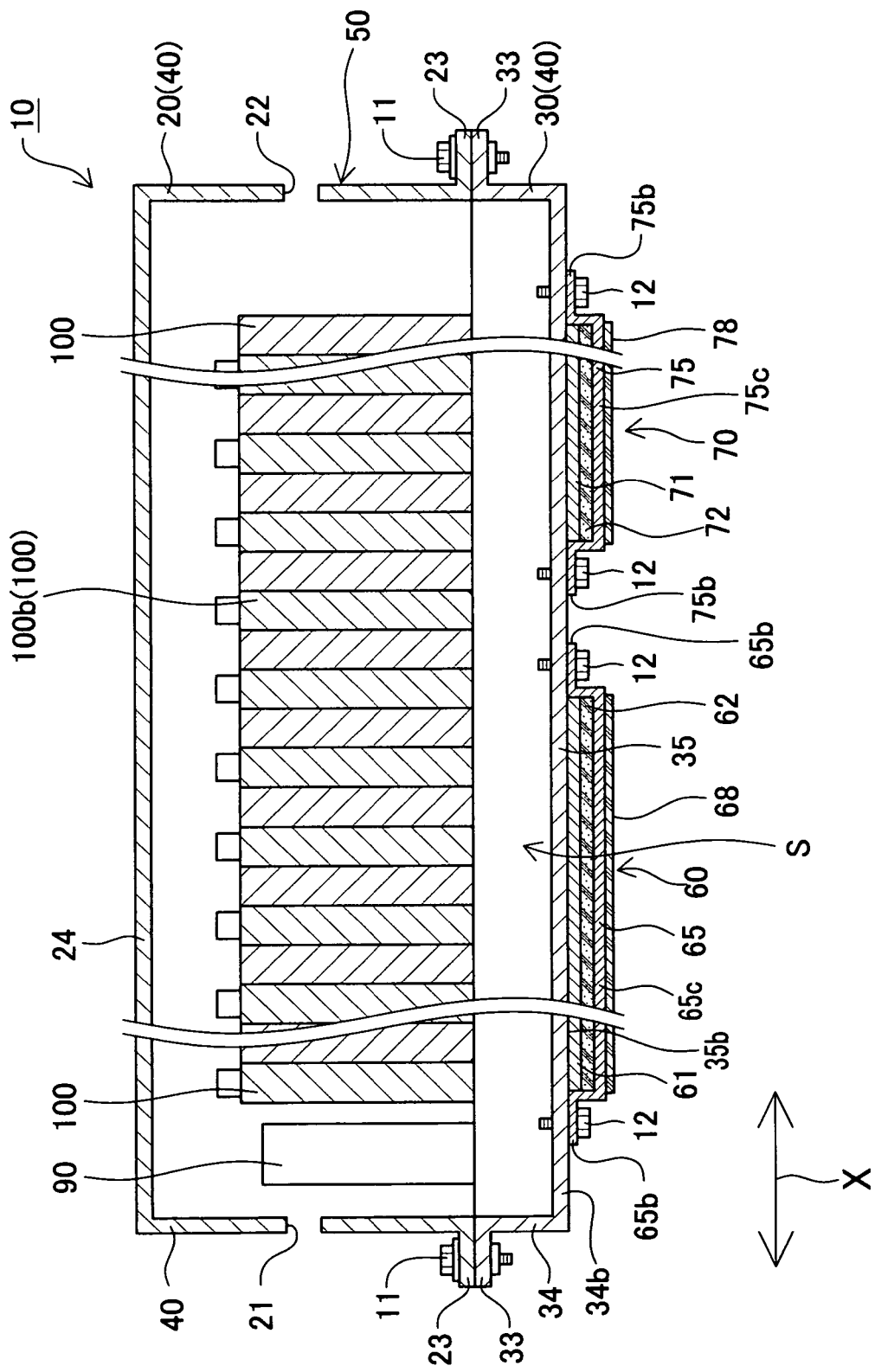
FIG. 3 is a sectional view of the heater-equipped battery structure of the embodiment, taken along a line P-P in FIG. 1.

As shown in FIG. 3, the battery pack 50 is provided with a housing case 40 including a first housing member 20 and a second housing member 30 and a plurality of secondary batteries (forty batteries in the present embodiment) 100 housed in the housing case 40. In the present embodiment, the battery pack 50 corresponds to a battery structure.

Figure 4:
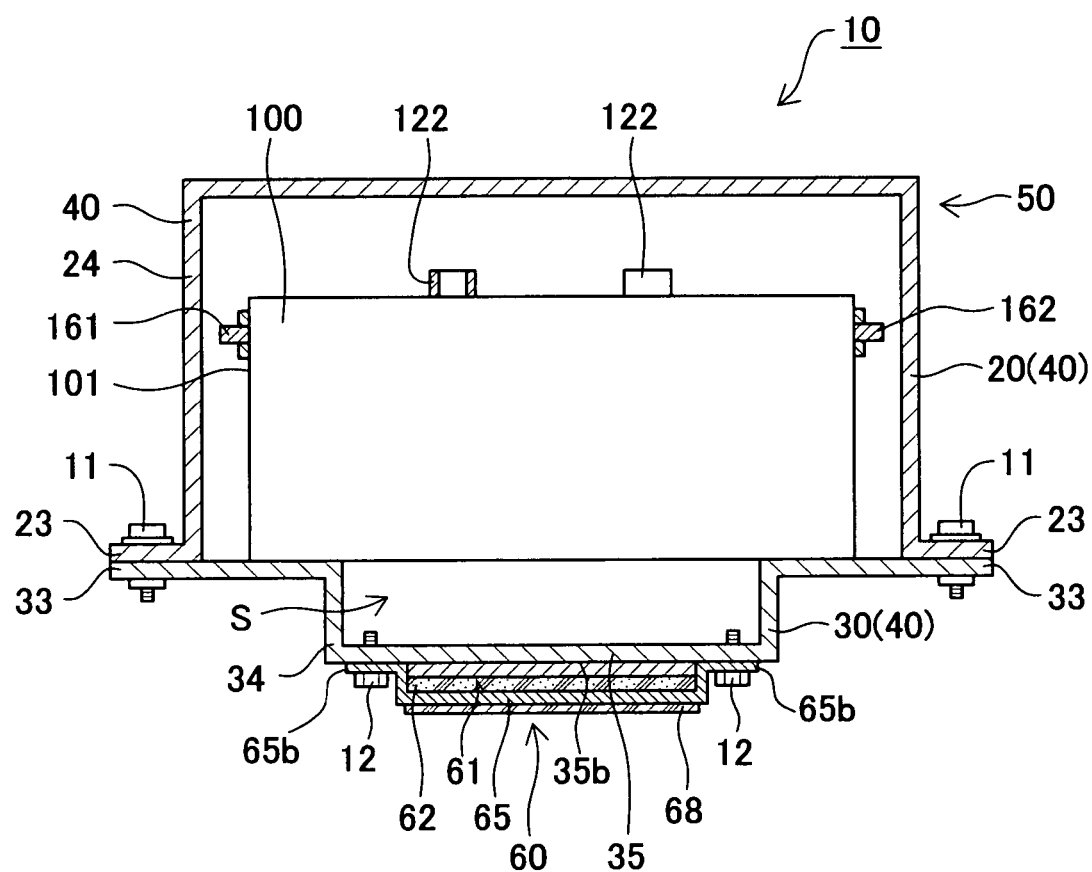
FIG. 4 is another sectional view of the heater-equipped battery structure of the embodiment, taken along a line Q-Q in FIG. 2.
Figure 5:
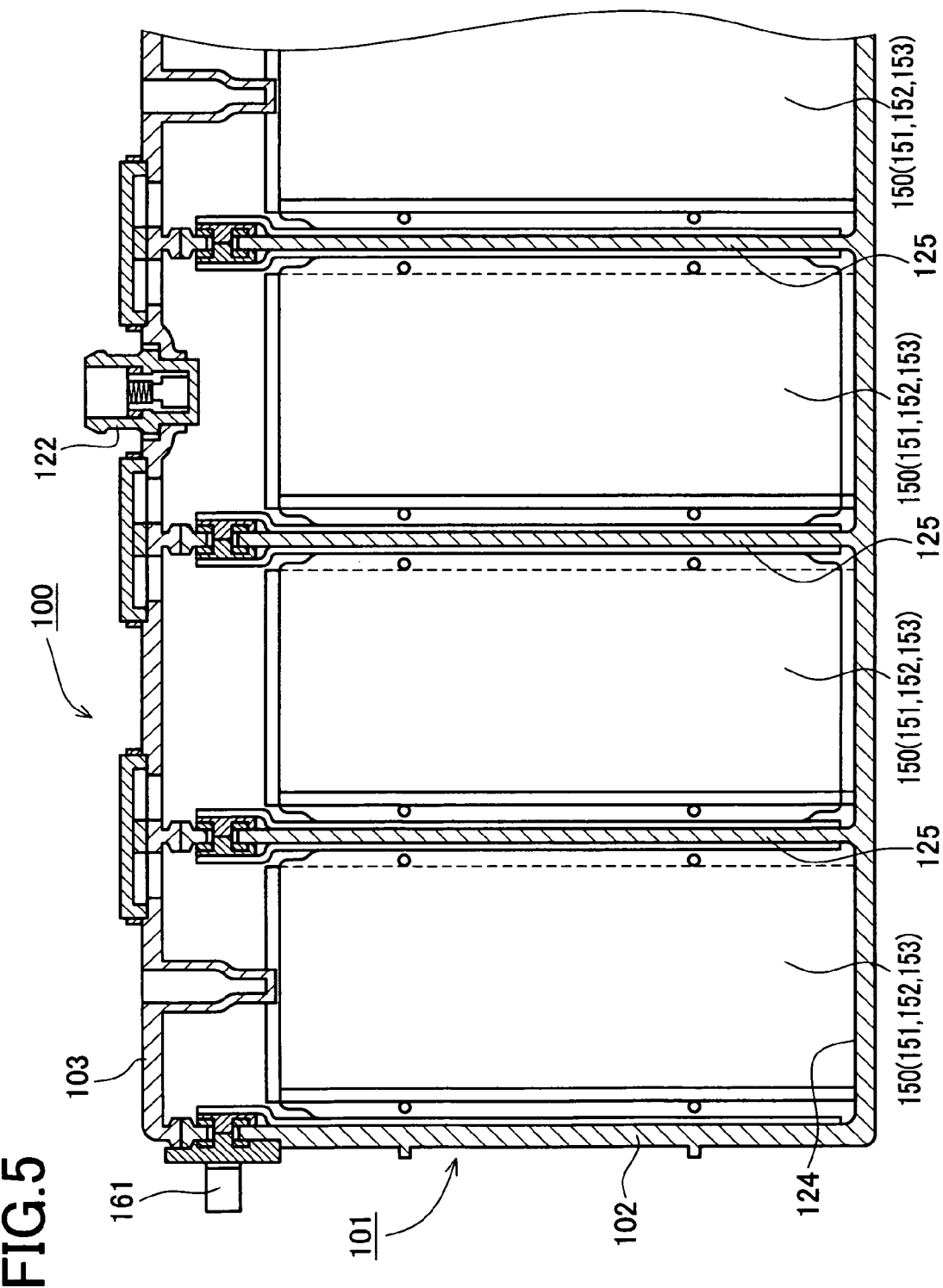
FIG. 5 is a sectional view of a secondary battery of the embodiment.

Each secondary battery 100 is a nickel-metal hydride storage sealed battery provided with a battery case 101, a positive terminal 161, and a negative terminal 162, as shown in FIG. 4. The battery case 101 includes a resin case body 102 of a nearly rectangular box shape and a resin cover 103 of a nearly rectangular plate shape. The case body 102 is internally divided into six compartments 124 by partition walls 125. Each compartment 124 accommodates an electrode plate group 150 (positive electrode plates 151, negative electrode plates 152, and separators 153) and an electrolyte (not shown). The electrode plate groups 150 individually accommodated in the compartments 124 are connected in series to one another. Accordingly, the secondary battery 100 of the present embodiment constitutes a battery module in which six cells are connected in series.

The electrode plate group 150 and the electrolyte (not shown) correspond to a power generating element. The cover 103 is provided with a safety valve 122.

In the present embodiment, as shown in FIG. 3, forty secondary batteries 100 each of which is configured as above are arranged in a row in a row direction X (in a lateral direction in FIG. 3) and are connected in series to one another.

The first housing member 20 is made of metal in rectangular recessed shape as shown in FIG. 3 and includes a housing section 24 in which the secondary batteries 100 are housed and a rectangular annular flange 23 formed around an open end of the housing section 24. A second housing member 30 includes a rectangular recessed part 34 made of metal and a rectangular annular flange 33 formed around an open end of the recessed part 34.

The secondary batteries 100 are fixedly mounted on the flange 33 (see FIGS. 3 and 4). Further, the first housing member 20 is secured to the second housing member 30 with mounting bolts 11 while the flange 23 abuts against the flange 33 of the second housing member 30 to house the plurality of secondary batteries 100 in the housing section 24.

In this battery pack 50, of a bottom wall 34b of the recessed part 34 of the secondary housing member 30, the portion located with a space S from the secondary batteries 100 is referred to as a spaced part 35. In the present embodiment, therefore, the outer surface of the spaced part 35 forms a surface 35b to be heated (hereinafter, referred to as a "heated surface").

Figure 6:
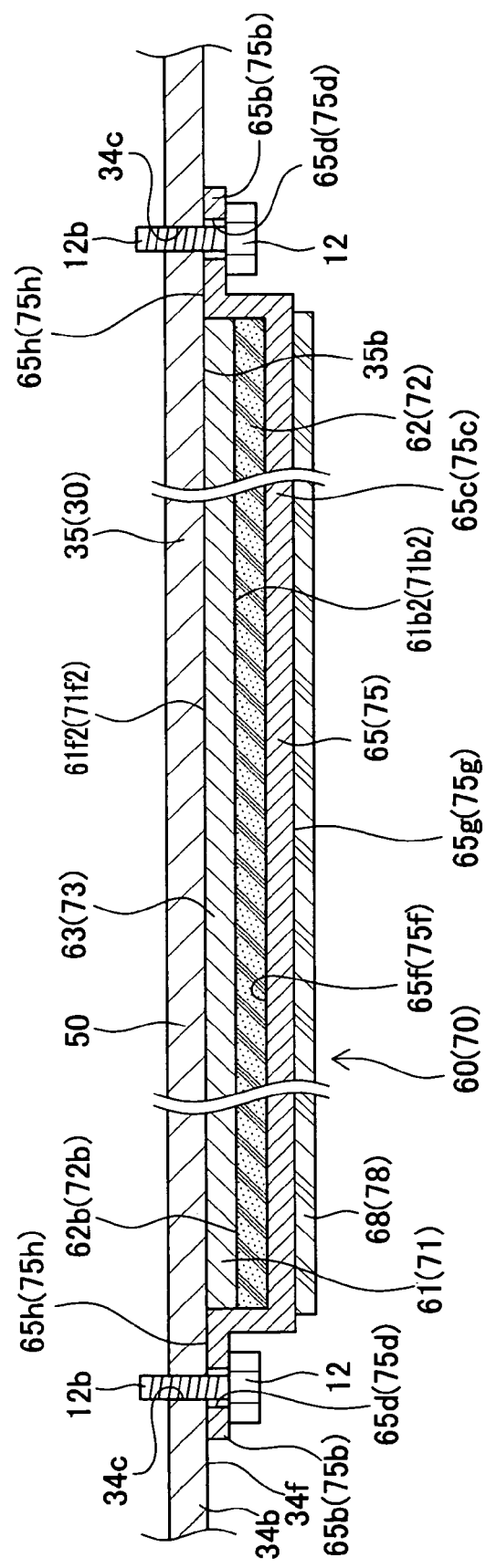
FIG. 6 is a sectional view of a first heater unit (a second heater unit)

The first heater unit 60 includes, as shown in FIG. 6, a first lead wire-equipped laminated sheet heater 63, a first sheet 62, a first holder (a holding member) 65 which holds them, and a heat insulating member 68. The heater 63 is bonded to a first surface 62b of the first sheet 62, and the first sheet 62 is bonded to a holding surface 65f of the first holder 65. The insulating member 68 is bonded to a surface 65g of the first holder 65 opposite the holding surface 65f. Accordingly, in the first heater unit 60, the heater 63, first sheet 62, first holder 65, and insulating member 68 are integrally bonded one on another.

Figure 7:
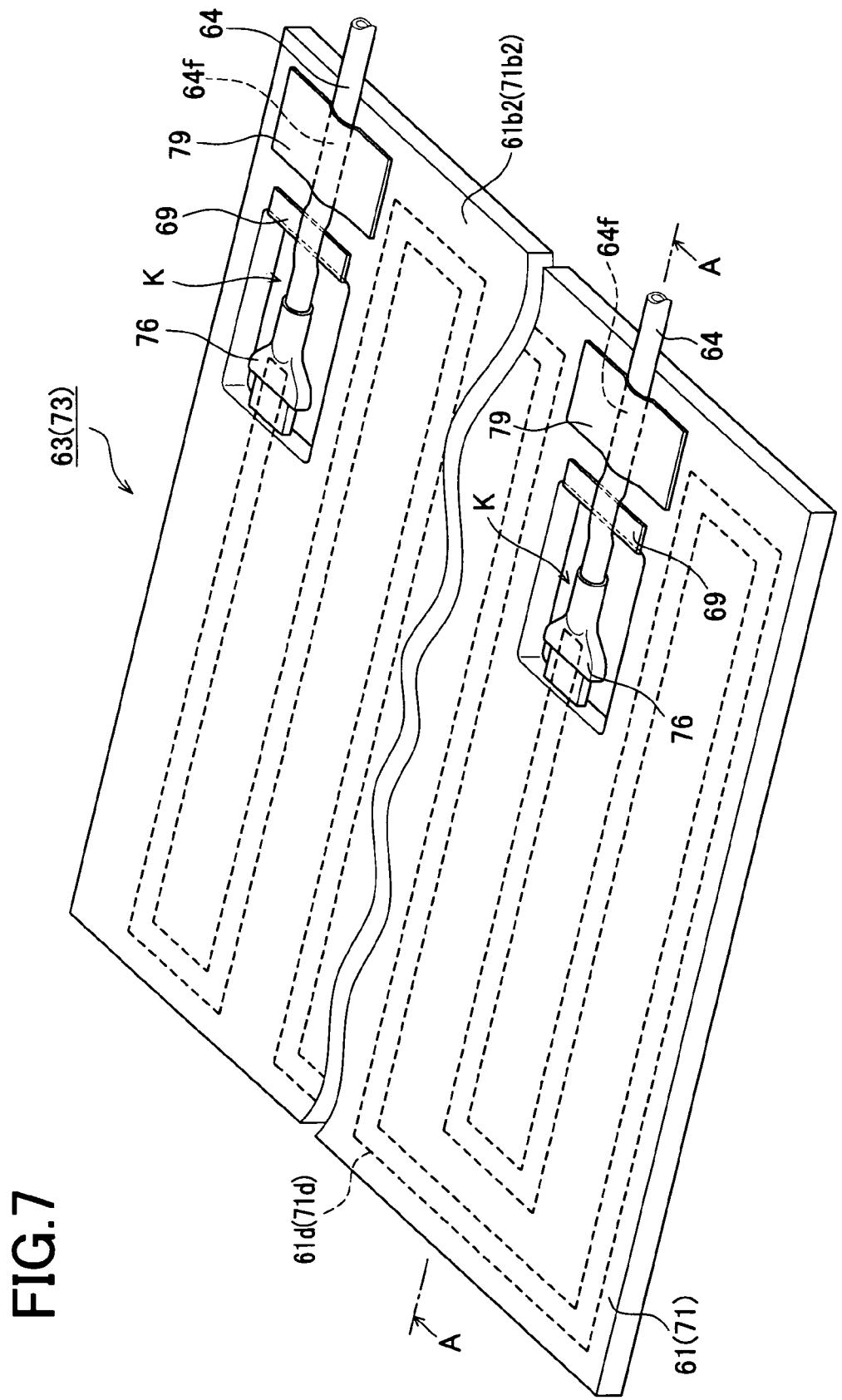
FIG. 7 is a perspective view of a first lead wire-equipped laminated sheet heater (a second lead wire-equipped laminated sheet heater)

The first lead wire-equipped laminated sheet heater 63 includes a first laminated sheet heater 61 of a thin plate shape and lead wires 64 as shown in FIG. 7.

Figure 8:
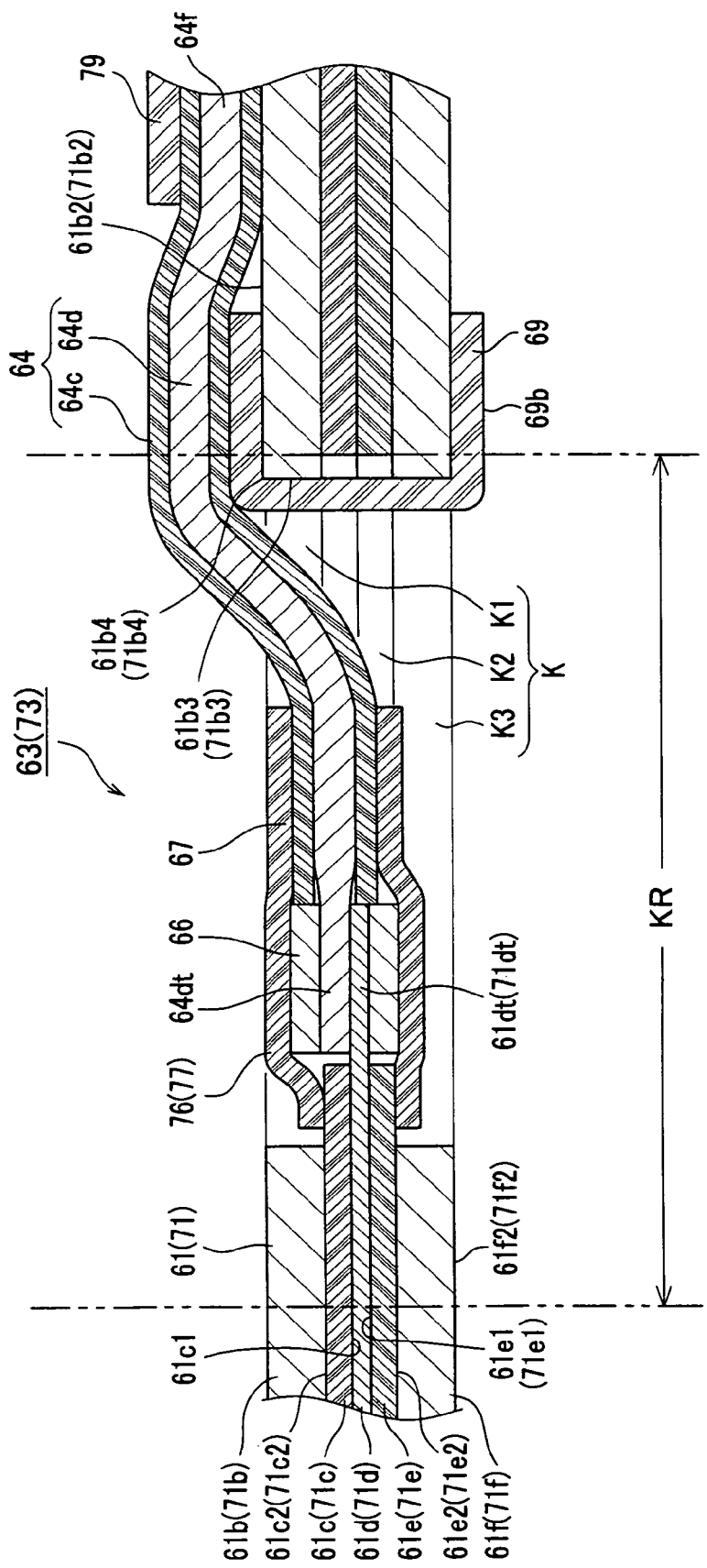
FIG. 8 is a sectional view of the first lead wire-equipped laminated sheet heater (the second lead wire-equipped laminated sheet heater), taken along a line A-A in FIG. 7.

The first laminated sheet heater 61 is a sheet heater of a laminated structure including, as shown in FIG. 8, a first insulating resin film 61c, a second insulating resin film 61e, a foil heater element 61d interposed between an inner surface 61c1 of the first insulating resin film 61c and an inner surface 61e1 of the second insulating resin film 61e, a first metal sheet 61b laminated on an outer surface 61c2 of the first insulating resin film 61c, and a second metal sheet 61f laminated on an outer surface 61e2 of the second insulating resin film 61e.

The foil heater element 61d is made of nickel chromium alloy foil, which is provided as a band-like shape extending in a predetermined pattern along the plane as indicated by a dotted line in FIG. 7. The first and second insulting resin films 61c and 61e are formed of polyimide films. Further, the first and second metal sheets 61b and 61f are made of aluminum thin sheets. The first insulating resin film 61c, second insulating resin film 61e, foil heater element 61d, first metal sheet 61b, and second metal sheet 61f are integrally bonded one on another.

In the first lead wire-equipped laminated sheet heater 63 of the present embodiment, the foil heater element 61d is interposed between two metal sheets (the first and second metal sheets 61b and 61f) through the insulating resin films (the first and second insulating resin films 61c and 61e). Thus, even when a large force is externally exerted on the heater 63, the foil heater element 61d can be protected appropriately.

Each lead wire 64 includes a metal lead core wire 64d and an insulating resin coat 64c coating the wire 64d. This lead wire 64 is configured such that a lead terminal portion 64dt forming one end of the lead core wire 64d is electrically connected to a heater terminal portion 61dt of the foil heater element 61d (see FIG. 8) and the other end of the lead core wire 64*d* is connectable to a household AC power source not shown. In the first lead wire-equipped laminated sheet heater 63 of the present embodiment, accordingly, the foil heater element 61*d* can be supplied with electric power from the household AC power source to generate heat.

A method of electrically connecting the lead core wire 64*d* of the lead wire 64 to the foil heater element 61*d* is explained below in detail.

The first lead wire-equipped laminated sheet heater 63 of the present embodiment is formed with a film void part K2 defined by a through hole formed through the first and second insulating resin films 61*c* and 61*e* as shown in FIG. 8. The heater terminal portion 61*dt* of the foil heater element 61*d* protrudes into the film void part K2 in a planar direction parallel to the surface of the first laminated sheet heater 61 (in a lateral direction in FIG. 8).

Furthermore, the lead terminal portion 64*dt* of the lead wire 64 is connected to the heater terminal portion 61*dt* in the inside of the film void part K2 in the planar direction of the first laminated sheet heater 61 (in the lateral direction in FIG. 8). Thus, a crimp-connection part 76 does not protrude outside from the outer periphery of the first laminated sheet heater 61 in the planar direction. This makes it possible to achieve a smaller mounting space of the first lead wire-equipped laminated sheet heater 63 in the planar direction of the first laminated sheet heater 61.

Figure 9:
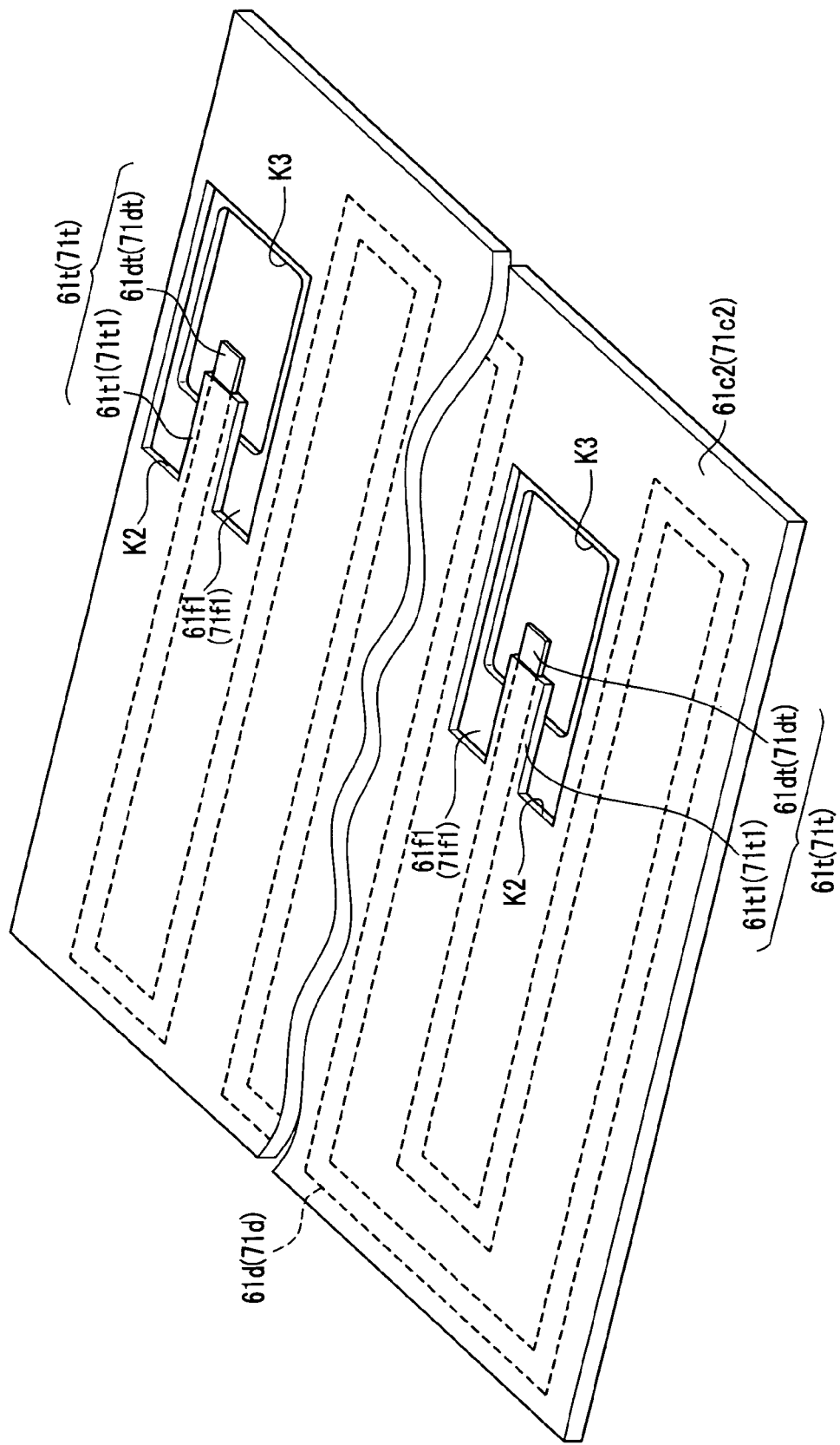
FIG. 9 is an explanatory view showing a method of manufacturing the first lead wire-equipped laminated sheet heater (the second lead wire-equipped laminated sheet heater)

Here, "the inside of the film void part K2 in the planar direction of the first laminated sheet heater 61" includes the inside of an imaginary region KR including a space imaginarily extending in a direction of the thickness of the first laminated sheet heater 61 (in a vertical direction in FIG. 8) as well as the inside of the film void part K2 (the specific shape is referred to FIG. 9).

The first lead wire-equipped laminated sheet heater 63 of the present embodiment is configured to hold the lead terminal portion 64*dt* and the heater terminal portion 61*dt* within the film void part K2 as shown in FIG. 8. Accordingly, the mounting space of the heater 63 can be reduced in not only the planar direction but also the thickness direction of the first laminated sheet heater 61.

Further, the lead terminal portion 64*dt* is placed in surface contact with the surface of the heater terminal portion 61*d* and crimp connected thereto. Specifically, the lead terminal portion 64*dt* is crimp connected to the surface of the heater terminal portion 61*dt* in such a way that they are placed in contact with each other in a cylindrical crimping member 66, and then the crimping member 66 is crimped. With such connecting configuration, the electrical connection between the lead terminal portion 64*dt* and the heater terminal portion 61*dt* can be maintained stably for a long term, leading to high reliability of the electrical connection between the foil heater element 61*d* and the lead wire 64.

In the first lead wire-equipped laminated sheet heater 63 of the present embodiment, as shown in FIG. 8, a connection part between the lead terminal portion 64*dt* and the heater terminal portion 61*dt* crimp-connected by the crimping member 66 is liquid-tightly covered by a covering member 67 made of thermal shrinkage rubber to form a crimp-connection part 76. It is accordingly possible to prevent a liquid such as water droplets from sticking to the lead terminal portion 64*dt* and the heater terminal portion 61*dt*. This can further enhance the reliability of electrical connection between the foil heater element 61*d* and the lead wire 64.

In the first lead wire-equipped laminated sheet heater 63 of the present embodiment, as shown in FIG. 8, the first metal sheet 61*b* is formed with a through hole defining a metal-sheet void part K1 continuous with the film void part K2. Similarly, the second metal sheet 61*f* is formed with a through hole defining a metal-sheet void part K3 continuous with the film void part K2. In other words, the metal-sheet void part K1, the film void part K2, and the metal-sheet void part K3 are continuous to form a heater void part K opening through the first laminated sheet heater 61 in the thickness direction (in the vertical direction in FIG. 8). Thus, the lead wire 64 can be mounted to extend from the heater void part K to the outside of the first laminated sheet heater 61 through the metal-sheet void part K1.

Further, the connecting configuration of the lead terminal portion 64*dt* and the heater terminal portion 61*dt* is achieved by the aforementioned crimp-connecting configuration, so that the thickness of the entire crimp-connection part 76 can be reduced. In the first lead wire-equipped laminated sheet heater 63 of the present embodiment, therefore, the entire crimp-connection part 76 can be placed within the heater void part K (the inside of the film void part K2 and the insides of the metal-sheet void parts K1 and K3) as shown in FIG. 8. This makes it possible to reduce the mounting space of the heater 63 in the thickness direction of the laminated sheet heater 61. Further, the possibility of damaging the crimp-connection part 76 by a mounting tool or the like can be restrained during a mounting work or the like for the heater 63 (the first heater unit 60). The reliability of electrical connection between the foil heater element 61*d* and the lead wire 64 can be more enhanced.

Meanwhile, in the first lead wire-equipped laminated sheet heater 63 of the first embodiment, the lead wire 64 is arranged to extend from the heater void part K to the outside through the metal-sheet void part K1 of the first metal sheet 61*b*. However, a corner portion 61*b*4 formed by an outer surface 61*b*2 of the first metal sheet 61*b* and an inner peripheral surface 61*b*3 defining the metal-sheet void part K1 may form a sharp corner or have burr or the like. Such a case may cause a risk of damaging the lead wire 64 extending through the metal-sheet void part K1 by the sharp corner portion 61*b*4 and the fin or the like that may exist at the corner portion 61*b*4.

In the first lead wire-equipped laminated sheet heater 63 of the present embodiment, on the other hand, the metal-sheet corner portion 61*b*4 is covered with a protective member 69 having a smooth outer surface 69*b* as shown in FIG. 8. Thus, the lead wire 64 is placed in contact with the smooth outer surface 69*b* of the protective member 69 without directly touching the metal-sheet corner portion 61*b*4 and fin. The lead wire 64 is therefore unlikely to be damaged. In the present embodiment, the protective member 69 is made of a polyimide film.

In the first lead wire-equipped laminated sheet heater 63 of the present embodiment, as shown in FIG. 7, part of each lead wire 64 is fixed to the outermost surface of the laminated sheet heater 61 (the outer surface 61*b*2 of the first metal sheet 61*b*) by a fixing member 79 (a resin film having an adhesive layer). Therefore, the crimp-connection part 76 (i.e., the heater terminal portion 61*dt* and the lead terminal portion 64*dt*) can be prevented from receiving any force through the lead wire 64 during handling of the heater 63. To be more specific, a portion of the lead wire 64 fixed to the outer surface 61*b*2 of the first metal sheet 61*b* and another portion of the lead wire 64 closer to the crimp-connection part 76 (the lead terminal portion 64*dt*) than the fixed portion will hardly move even when the lead wire 64 is handled for example in a mounting work for the heater 63. Thus, the crimp-connection part 76 (i.e., the heater terminal portion 61*dt* and the lead terminal portion 64*dt*) is unlikely to receive the force through the lead wire 64. The electrical connection between the heater terminal portion 61*dt* and the lead terminal portion 64*dt* can be maintained stably.

In the first lead wire-equipped laminated sheet heater 63 of the present embodiment, particularly, an adjacent lead portion 64*f* of the lead wire 64 located adjacent to the crimp-connection part 76 (the lead terminal portion 64*dt*) is fixed to the outer surface 61*b*2 of the first metal sheet 61*b* as shown in FIG. 7. Accordingly, the lead wire 64 is disposed so that the portion closer to the crimp-connection part 76 (the lead terminal portion 64*dt*) is shorter than the portion fixed to the outer surface 61*b*2 of the first metal sheet 61*b*. The portion of the lead wire 64 located closer to the crimp-connection part 76 is unlikely to move during the handling of the lead wire-equipped laminated sheet heater 63. It is therefore possible to more reliably prevent the force from being applied to the crimp-connection part 76 (i.e., the heater terminal portion 61*dt* and the lead terminal portion 64*dt*) through the lead wire 64. Thus, the reliability of electrical connection between the foil heater element 61*d* and the lead wire 64 can be more enhanced.

A method of manufacturing the first lead wire-equipped laminated sheet heater 63 of the present embodiment will be briefly explained. Firstly, as shown in FIG. 9, the second metal sheet 61*f*, the second insulating resin film 61*e*, the foil heater element 61*d*, and the first insulating resin film 61*c* are laminated in this order and bonded to one another. At that time, a band-shaped film heater section 61*t* is formed including a film protection part 61*t*1 in which the band-shaped foil heater element 61*d* is sandwiched between the band-shaped, first and second insulating resin films 61*c* and 61*e*, and a heater terminal portion 61*dt* formed of the foil heater element 61*d* that protrudes to be exposed from the end of the film protection part 61*t*1.

Figure 10:
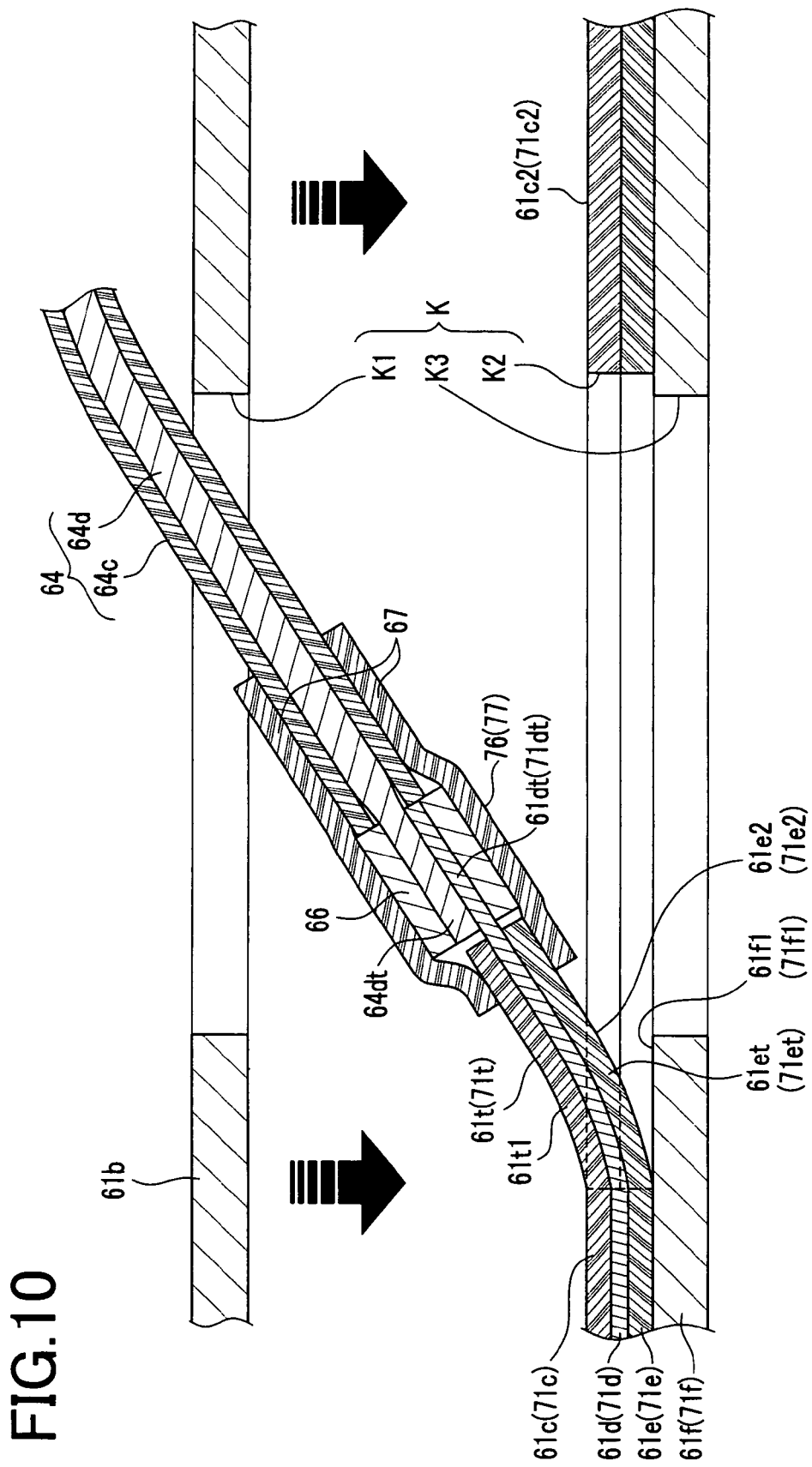
FIG. 10 is an explanatory view showing the method of manufacturing the first lead wire-equipped laminated sheet heater (the second lead wire-equipped laminated sheet heater)

According to the manufacturing method of the present embodiment, however, the band-shaped film heater section 61*t* is not bonded to the second metal sheet 61*b*. To be specific, of the second insulating resin film 61*e*, a band-shaped second insulating resin film portion 61*et* (see FIG. 10) constituting the film heater section 61*t* is laminated on an inner surface of the second metal sheet 61*f* but not adhered thereto. Consequently, when the heater terminal portion 61*dt* and the lead terminal portion 64*dt* are to be connected, the band-shaped film heater section 61*t* is then curved or the like to separate from the second metal sheet 61*f* as shown in FIG. 10, ensuring sufficient space for a connecting work. The work of connecting the heater terminal portion 61*dt* and the lead terminal portion 64*dt* can thus be smoothly performed.

In addition, the band-shaped film heater section 61*t* has the film protection part 61*t*1 which is sufficiently longer than the heater terminal portion 61*dt*, so that excessive force will not be exerted on the heater terminal portion 61*dt* even when the film protection part 61*t*1 is curved or the like. The heater terminal portion 61*dt* can be protected from damages during the work of connecting the heater terminal portion 61*dt* and the lead terminal portion 64*dt*. Since the film protection part 61*t*1 is so long as to ensure sufficient space for the connecting work even if it is not largely curved or bent, there is no risk of damaging the foil heater element 61*d* located in the film protection part 61*t*1.

Thereafter, when the first metal sheet 61*b* is to be laminated on the outer surface 61*c*2 of the first insulating resin film 61*c*, the lead wire 64 can also be inserted through the void part K1 of the first metal sheet 61*b* by curving or bending the film protection part 61*t*1 of the band-shaped film heater section 61*t* as shown in FIG. 10. There is no risk of exerting excess force on the crimp-connection part 76 (the heater terminal portion 61*dt* and the lead terminal portion 64*dt*) in the work of laminating the first metal sheet 61*b*, resulting in higher reliability of electrical connection between the heater terminal portion 61*dt* and the lead terminal portion 64*dt*.

In the present embodiment, the through holes defining the void part K1 of the first metal sheet 61*b* and the void part K3 of the second metal sheet 61*f* are formed to be smaller in diameter than the through hole defining the film void part K2. Thus, the film protection part 61*t*1 of the band-shaped film heater section 61*t* can be fixed between the first and second metal sheets 61*b* and 61*f*. The crimp-connection part 76 can be kept from vibrating even when it is used under an environment susceptible to vibration. Accordingly, the electrical connection between the heater terminal portion 61*dt* and the lead terminal portion 64*dt* can be maintained stably.

Then, the metal-sheet corner portion 61*b*4 and others are covered by the protective member 69 as shown in FIGS. 7 and 8, and the adjacent lead portion 64*f* of the lead wire 64 is fixed to the outer surface 61*b*2 of the first metal sheet 61*b* by the fixing member 79. The first lead wire-equipped laminated sheet heater 63 is finally completed.

The first sheet 62 is a thin sheet made of urethane foam interposed between the first lead wire-equipped laminated sheet heater 63 and the first holder 65 as shown in FIG. 6. This first sheet 62 is elastically deformable in a thickness direction (in a vertical direction in FIG. 6).

The first holder 65 is of a rectangular recessed shape including a holding part 65*c* internally holding the heater 63 and the first sheet 62 and a rectangular annular flange 65*b* formed surrounding an open end of this holding part 65*c*. This flange 65*b* is formed with a plurality of through holes 65*d* each allowing a screw-threaded portion 12*b* of a mounting bolt 12.

Further, the bottom wall 34*b* of the second housing member 30 is also formed with screw-threaded holes 34*c* in each of which the threaded portion 12*b* of the mounting bolt 12 is threadably engaged. In the present embodiment, the screw-threaded portion 12*b* of the mounting bolt 12 is inserted through the through hole 65*d* of the flange 65*b* and tightened in the screw-threaded hole 34*c* of the bottom wall 34*b* of the second housing member 30, thereby detachably fixing the first heater unit 60 to the outer surface 34*f* of the bottom wall 34*b* of the second housing member 30.

As above, the first heater unit 60 is detachably provided outside the housing case 40 (i.e., on the outer surface 34*f* of the bottom wall 34*b* of the second housing member 30). Accordingly, the first heater unit 60 can easily be detached from and attached to the housing case 40 of the battery pack 50. This configuration can improve workability in maintenance, replacement, or the like for the first lead wire-equipped laminated sheet heater 63.

In the present embodiment, furthermore, the first sheet 62 is sandwiched between the first lead wire-equipped laminated sheet heater 63 and the first holder 65 while the first sheet 62 is elastically compressed in the thickness direction of the heater 63 (in the vertical direction in FIG. 6). By the elastic force resulting from the elastically compressive-deformed first sheet 62, an outer surface 61*f*2 of the second metal sheet 61*f* can be placed in close contact with the heated surface 35*b*. In this state, any gap is unlikely to occur between the outer surface 61*f*2 of the second metal sheet 61*f* and the heated surface 35*b*. With the sheet heater 63, therefore, the battery pack 50 can be heated appropriately.

In the first lead wire-equipped laminated sheet heater 63, as shown in FIG. 8, the lead wire 64 is arranged extending over the outer surface 61*b*2 of the first metal sheet 61*b*. The thickness (i.e. diameter) of the lead wire 64 located on the outer surface 61b2 is absorbed by the deformation of the first sheet 62. The outer surface 61b2 of the first metal sheet 61b can be pressed by the first sheet 62 appropriately, bringing the outer surface 61f2 of the second metal sheet 61f in close contact with the heated surface 35b.

Since the heat of the first laminated sheet heater 61 can be conducted to the battery pack 50 appropriately, the temperature of the first laminated sheet heater 61 can also be prevented from excessively increasing locally.

The second heater unit 70 includes, as indicated by reference codes in parentheses in FIG. 6, a second lead wire-equipped laminated sheet heater 73, a second sheet 72, a second holder (a holding member) 75 which holds them, and a heat insulating member 78. In this second heater unit 70, as with the first heater unit 60, the heater 73, second sheet 72, second holder 75, and insulating member 78 are integrally bonded one on another.

The second lead wire-equipped laminated sheet heater 73, second sheet 72, second holder 75, and insulating member 78 which constitute the second heater unit 70 are respectively the same in structure as the first lead wire-equipped laminated sheet heater 63, first sheet 62, first holder 65, and insulating member 68 which constitute the first heater unit 60. Hence, the similar parts of the second heater unit 70 to those of the first heater unit 60 are briefly explained or omitted.

The second lead wire-equipped laminated sheet heater 73 includes a second laminated sheet heater 71 of a thin plate shape and lead wires 64 as indicated by reference codes in parentheses in FIG. 7. This heater 73 is similar in structure to the aforementioned first lead wire-equipped laminated sheet heater 63 as indicated by reference codes in parentheses in FIGS. 7 and 8 and hence will be explained shortly.

The second lead wire-equipped laminated sheet heater 73 is arranged such that the lead terminal portion 64dt of the lead wire 64 is connected to a heater terminal portion 71dt in the inside of the film void part K2 (specifically, within the film void part K2) in the planar direction of the second laminated sheet heater 71 (in the lateral direction in FIG. 8). Thus, the crimp-connection part 77 does not protrude outside from the outer periphery of the second laminated sheet heater 71 in the planar direction. This makes it possible to achieve a smaller mounting space of the heater 73 in the planar direction of the second laminated sheet heater 71.

Further, the lead terminal portion 64dt is placed in surface contact with the surface of the heater terminal portion 71dt and crimp connected thereto. Specifically, the lead terminal portion 64dt is crimp connected to the surface of the heater terminal portion 71dt in such a way that they are placed in contact with each other in the cylindrical crimping member 66 and then the crimping member 66 is crimped. With such connecting configuration, the electrical connection between the lead terminal portion 64dt and the heater terminal portion 71dt can be maintained stably for a long term, leading to high reliability of the electrical connection between the foil heater element 71d and the lead wire 64.

In the second lead wire-equipped laminated sheet heater 73, as shown in FIG. 8, a connection part between the lead terminal portion 64dt and the heater terminal portion 71dt crimp-connected by the crimping member 66 is liquid-tightly covered by the covering member 67 made of thermal shrinkage rubber to form the crimp-connection part 77. It is accordingly possible to prevent a liquid such as water droplets from sticking to the lead terminal portion 64dt and the heater terminal portion 71dt. This can further enhance the reliability of electrical connection between the foil heater element 71d and the lead wire 64.

Further, the connecting configuration between the lead terminal portion 64dt and the heater terminal portion 71dt is achieved by the aforementioned crimp-connecting configuration, so that the thickness of the entire crimp-connection part 77 can be reduced. In the second lead wire-equipped laminated sheet heater 73, therefore, the entire crimp-connection part 77 can be placed within the heater void part K (the inside of the film void part K2 and the insides of the metal-sheet void parts K1 and K3) as shown in FIG. 8. Accordingly, the mounting space of the heater 73 can be reduced in the thickness direction of the second laminated sheet heater 71. Further, the possibility of damaging the crimp-connection part 77 by a mounting tool or the like can be restrained during a mounting work or the like for the heater 73 (the second heater unit 70). The reliability of electrical connection between the foil heater element 71d and the lead wire 64 can be more enhanced.

In the second lead wire-equipped laminated sheet heater 73, moreover, a metal-sheet corner portion 71b4 is covered with the protective member 69 (in the present embodiment, a polyimide film) having the smooth outer surface 69b as shown in FIG. 8. Thus, the lead wire 64 is placed in contact with the smooth outer surface 69b of the protective member 69 without directly touching the metal-sheet corner portion 71b4 and fin. The lead wire 64 is therefore unlikely to be damaged.

A heating function of the heater-equipped battery structure 10 will be explained below in detail.

In the heater-equipped battery structure 10 of the present embodiment, as mentioned above, the first and second lead wire-equipped laminated sheet heaters 63 and 73 are provided on the heated surface 35b, of the spaced part 35 of the second housing member 30 (the housing case 40) (see FIG. 3). This configuration allows the heat of the first laminated sheet 61 and the second laminated sheet 71 to be conducted to the spaced part 35, heating the air in the space S through the heated spaced part 35. Then, each secondary battery 100 is exposed to the heated air and heated.

In the heater-equipped battery structure 10 of the present embodiment, accordingly, the first and second laminated sheet heaters 61 and 71 are supplied with electric power from the household AC power source not shown through the lead wires 64 to warm up each secondary battery 100 appropriately. In the case where the heater-equipped battery structure 10 of the present embodiment is mounted as a power source for a hybrid electric vehicle, for example, each secondary battery 100 can be heated by use of the household AC power source while the vehicle is parked in a home garage. In this manner, each secondary battery 100 can be warmed up even in a low temperature environment and therefore can serve as the vehicle power source to provide excellent output even at the vehicle start.

According to the manner of heating through the air in the space S as mentioned above, it is possible to prevent uneven heating among the secondary batteries 100 constituting the battery pack 50 and therefore reduce temperature variations among the secondary batteries 100. This makes it possible to minimize variations in output characteristics among the secondary batteries 100. The entire battery pack 50 in which the secondary batteries 100 are connected in series can therefore produce stable output.

In particular, the first and second lead wire-equipped laminated sheet heaters 63 and 73 are configured with high reliability of electrical connection between the foil heater elements 61d and 71d and the lead wires 64 respectively and therefore can heat each secondary battery 100 appropriately. According to the heater-equipped battery structure 10 of the present embodiment, the entire battery pack 50 composed of the secondary batteries 100 connected in series can produce stable output for a long term.

In the present embodiment, additionally, since the space S exists as well as the spaced part 35 between the first and second lead wire-equipped laminated sheet heaters 63 and 73 and each of the secondary batteries 100, each secondary battery 100 can be prevented from excessively increase in temperature.

In the first heater unit 60 of the present embodiment, as shown in FIG. 6, the heat insulating member 68 is provided on the surface 65g of the holder 65 opposite the holding surface 65f. Similarly, in the second heater unit 70, the heat insulating member 78 is provided on the surface 75g of the holder 75 opposite the holding surface 75f. Accordingly, the heat of the first and second laminated heaters 61 and 71 are unlikely to escape outward through the opposite surfaces 65g and 75g of the holders 65 and 75.

Figure 11:
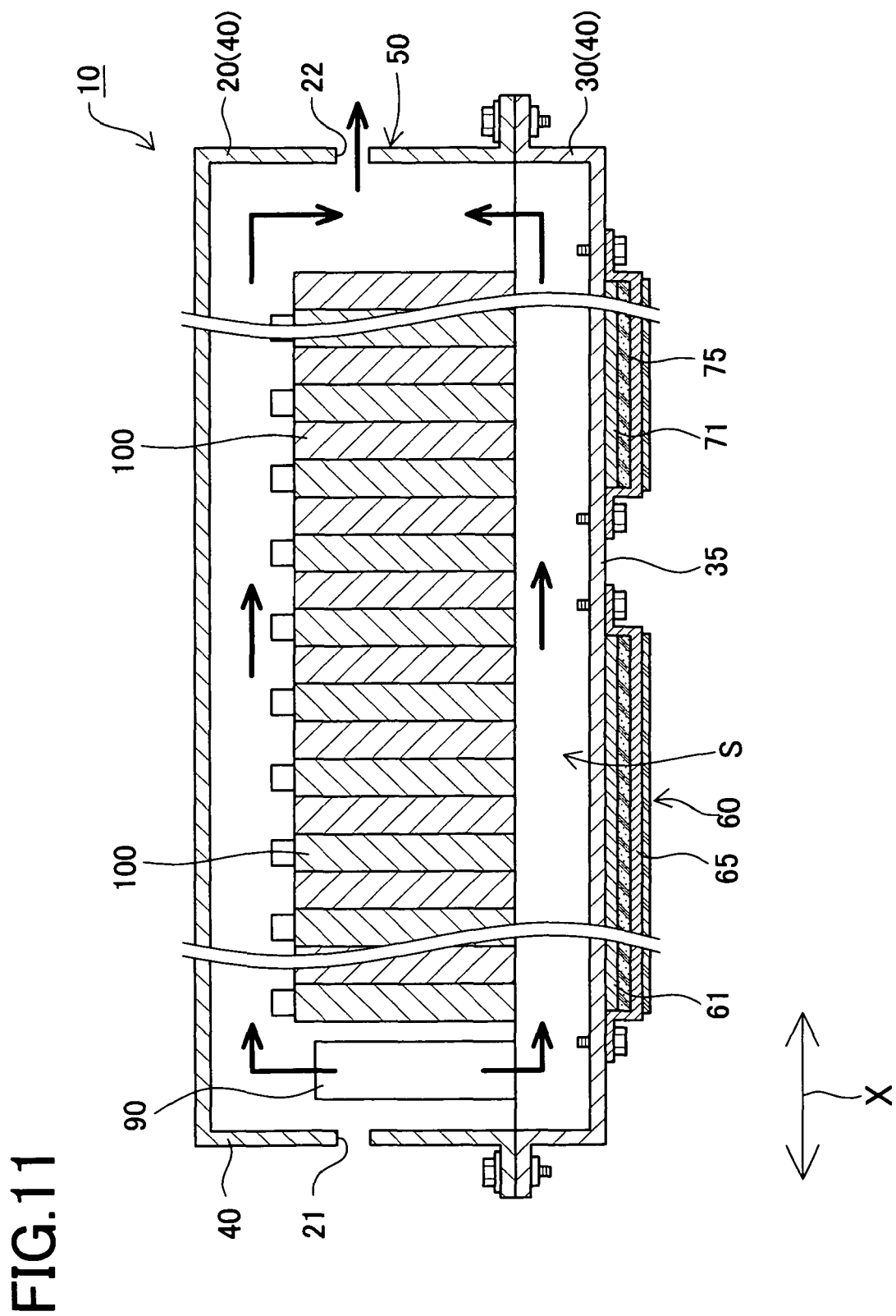
FIG. 11 is an explanatory view showing a cooling function of the heater-equipped battery structure, taken along the line P-P in FIG. 1.

In the heater-equipped battery structure 10 of the present embodiment, as shown in FIG. 3, a cooling device 90 is placed in the housing case 40. If the temperatures of the secondary batteries 100 rise to high temperatures, the cooling device 90 is operated to cool the secondary batteries 100. More specifically, as shown in FIG. 11, upon activation, the cooling device 90 takes in outside air through a first air hole 21 of the first housing member 20, delivers cooling air (outside air) through the inside of the housing case 40 including the space S, and discharges the heat of the secondary batteries 100 out of the structure 10 through a second air hole 22. Thus, each of the secondary batteries 100 can be cooled appropriately. In the present embodiment, particularly, no heater exists between each secondary battery 100 and the air passage (including the space S) and therefore each secondary battery 100 can be cooled efficiently.

Modified Example 1

Modified example 1 is different in only the lead wire-equipped laminated sheet heater from the above embodiment and the same in other parts. The following explanation is made on different parts from the above embodiment and the explanation of similar parts is omitted or simplified.

Figure 12:
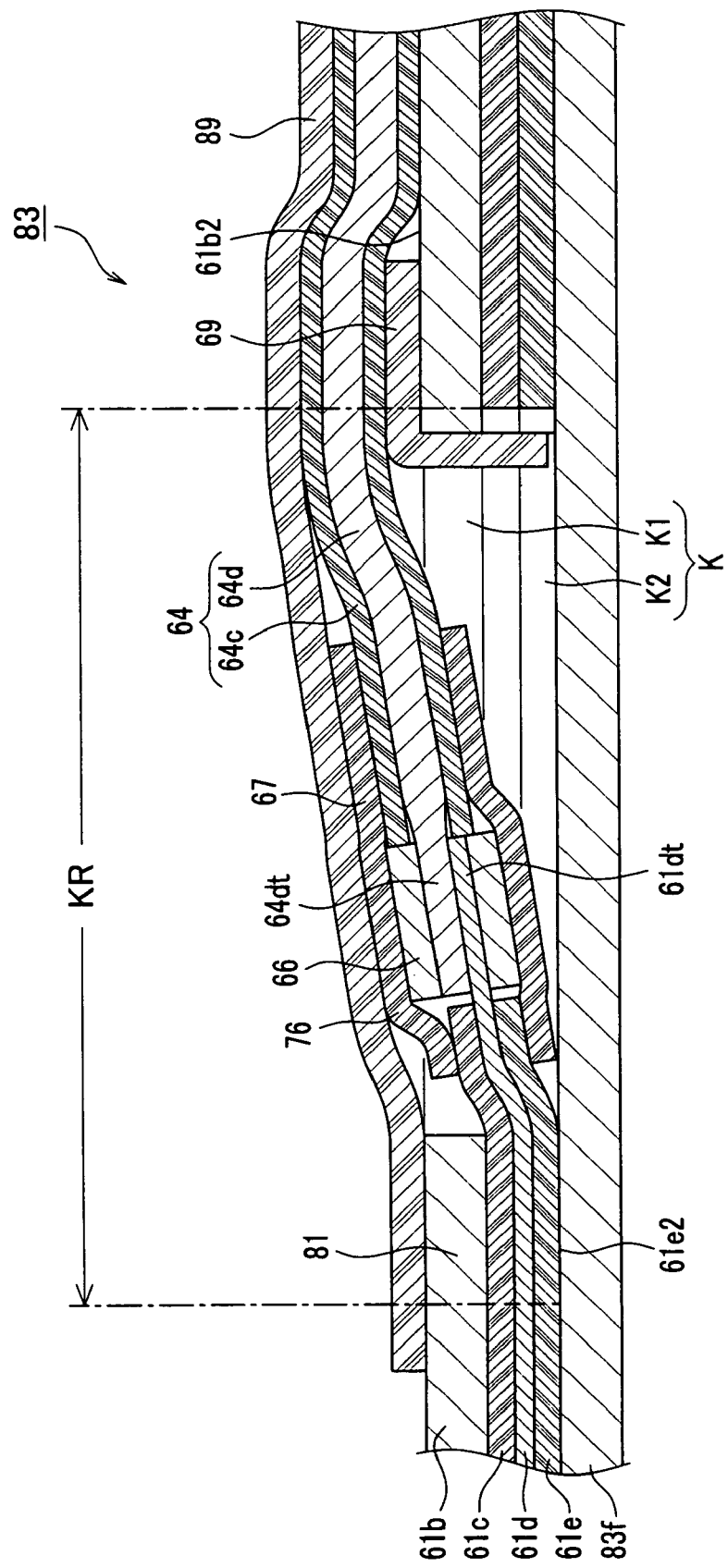
FIG. 12 is a sectional view of a lead wire-equipped laminated sheet heater of a first modified example.

The first lead wire-equipped laminated sheet heater 63 of the above embodiment uses the second metal sheet 61f provided with the metal-sheet void part K3 continuous with the film void part K2 (see FIG. 8). On the other hand, a first lead wire-equipped laminated sheet heater 83 of the modified example 1 uses a second metal sheet 83f covering the film void part K2 as the second metal sheet as shown in FIG. 12. Accordingly, the crimp-connection part 76 (the heater terminal portion 61dt and the lead terminal portion 64dt) placed within the heater void part K (inside of the film void part K2 and the metal-sheet void part K1) can be protected by the second metal sheet 83f. Specifically, in the work of mounting the first lead wire-equipped laminated sheet heater 83, for example, the second metal sheet 83f can prevent insertion of any mounting tool or the like in the heater void part K from below (in FIG. 12) to thereby avoid damage to the crimp-connection part 76 (the heater terminal portion 61dt and the lead terminal portion 64dt). Consequently, the reliability of electrical connection between the heater terminal portion 61dt and the lead terminal portion 64dt can be more enhanced.

In the first lead wire-equipped laminated sheet heater 83 of the modified example 1, a fixing member 89 whereby the lead wire 64 is fixed to the outermost surface of the laminated sheet heater (the outer surface 61b2 of the first metal sheet 61b) covers the heater void part K (the film void part K2 and the metal-sheet void part K1) as well as the crimp-connection part 76 from above the outer surface 61b2 of the first metal sheet 61b. Thus, the crimp-connection part 76 can be protected by the fixing member 89. To be specific, the crimp-connection part 76 is unlikely to be damaged erroneously by the mounting tool or the like in the mounting work of the first lead wire-equipped laminated sheet heater 83. It is further possible to restrain entrance of water droplets or the like into the heater void part K (inside of the film void part K2 and the metal-sheet void part K1) from the outside. According to the lead wire-equipped laminated sheet heater of the modified example 1 according to the present invention, the reliability of electrical connection between the heater terminal portion 61dt and the lead terminal portion 64dt can be more enhanced.

In the first lead wire-equipped laminated sheet heater 83 of the present modified example, similarly, the lead terminal portion 64dt of the lead wire 64 is connected to heater terminal portion 61dt within the film void part K2 in the planar direction of the first laminated sheet heater 81 (in the lateral direction in FIG. 12). Thus, the crimp-connection part 76 does not protrude outside from the outer periphery of the first laminated sheet heater 81 in the planar direction. This makes it possible to achieve a smaller mounting space of the first lead wire-equipped laminated sheet heater 83 in the planar direction of the first lead wire-equipped heater 81 (in the lateral direction in FIG. 12).

Modified Example 2

Modified example 2 is different in only the lead wire-equipped laminated sheet heater from the above embodiment and the same in other parts. Thus, the following explanation is made on different parts from the above embodiment and the explanation of similar parts is omitted or simplified.

In the first lead wire-equipped laminated sheet heater 63 of the above embodiment, two heater void parts K are provided in the form of the through hole formed through the laminated sheet heater 61 in the thickness direction (see FIG. 7). In a first lead wire-equipped laminated sheet heater 173 of the modified example 2, on the other hand, one of the void parts is provided as a heater void part L defined by a recess formed by cutting away an edge part inward in the planar direction of a first laminated sheet heater 171 as shown in FIG. 13. To be specific, the heater void part L is constituted of a metal-sheet void part L1 defined by a recess formed by cutting away an edge part of a first metal sheet 171b inward in the planar direction of the first laminated sheet heater 171, a film void part L2 defined by a recess formed by cutting away edge parts of first and second insulating resin films 171c and 171e inward in the planar direction of the first laminated sheet heater 171, and a metal-sheet void part L3 defined by a recess formed by cutting away part of a second metal sheet 171f inward in the planar direction of the first laminated sheet heater 171.

Even where the film void part L2 is provided in the form of the film recess, the crimp-connection part 76 is placed in the inside of the film void part L2 in the planar direction of the first laminated sheet heater 171 (that is, the lead terminal portion 64dt and the heater terminal portion 61dt are connected). Accordingly, similarly to the first lead wire-equipped laminated sheet heater 63 of the above embodiment, a smaller mounting space of the first lead wire-equipped sheet heater 173 in the planar direction of the first laminated sheet heater 171 can be achieved.

The above description is made to explain the present invention referring to the preferred embodiment and modified examples 1 and 2. However, the present invention is not limited to the aforementioned embodiment and examples and may be embodied in other specific forms without departing from the essential characteristics thereof.

For instance, the above embodiment and examples exemplify, as a battery structure to be heated, the battery pack 50 including the plurality of secondary batteries 100 (forty batteries in the preferred embodiment) and the housing case 40 that houses them. As an alternative, a battery structure may be a cell, a battery module, or others. Specifically, a configuration that directly heats the cell, module, or others by a heater may be adopted.

In the above embodiment and examples, the battery module is exemplified as the secondary battery 100. Alternatively, a cell may be adopted as the secondary battery.

The above embodiment and examples use the secondary battery 100 including the resin battery case 101 and others. The material of the battery case may be other material such as metal besides resin. Further, although the above embodiment and examples use the nickel-metal hydride storage battery, the present invention can be applied to the case where different types of batteries (including a primary battery) such as a lithium-ion battery are used.

The above embodiment and examples exemplify the first lead wire-equipped laminated sheet heater 63 in which the first and second metal sheets 61b and 61f are laminated and other laminated sheet heaters. Alternatively, the present invention can also be applied to a lead wire-equipped laminated sheet heater in which one of the first and second metal sheets is not included and another lead wire-equipped laminated sheet heater in which the first and second metal sheets are not included.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A laminated sheet heater comprising:
   a first insulating resin film;
   a second insulating resin film;
   a heater element interposed between an inner surface of the first insulating resin film and an inner surface of the second insulating resin film; and
   a film void part defined by one of a film through hole formed through at least one of the first and second insulating resin films and a film recess formed inward in at least one of the first and second insulating resin films in a planar direction of the laminated sheet heater,
   wherein the heater element includes a heater terminal portion connectable to a lead wire through which electric current can be conducted to the heater element, the heater terminal portion being formed protruding into the film void part in the planar direction, and the heater element is a foil heater element made of metal foil in one of a band shape and a sheet shape.

2. The laminated sheet heater according to claim 1, wherein the heater terminal portion is placed in an inside of the film void part.

3. A laminated sheet heater with lead wire comprising:
   a first insulating resin film;
   a second insulating resin film;
   a heater element interposed between an inner surface of the first insulating resin film and an inner surface of the second insulating resin film; and
   a film void part defined by one of a film through hole formed through at least one of the first and second insulating resin films and a film recess formed inward in at least one of the first and second insulating resin films in a planar direction of the laminated sheet heater, wherein
   the heater element includes a heater terminal portion connectable to a lead wire through which electric current can be conducted to the heater element,
   the heater terminal portion being formed protruding into the film void part in the planar direction,
   the lead wire including a lead core wire that is electrically connected to the heater element through the heater terminal portion;
   the lead core wire of the lead wire includes a lead terminal portion that is crimp-connected to the heater terminal portion by a crimping member so that the lead terminal portion is in close contact with a surface of the heater terminal portion in an inside of the film void part in the planar direction,
   the laminated sheet heater includes at least one of a first metal sheet laminated on an outer surface of the first insulating resin film and a second metal sheet laminated on an outer surface of the second insulating resin film, and
   the film void part is covered by the first metal sheet from above the outer surface of the first insulating resin film or by the second metal sheet from above the outer surface of the second insulating resin film.

4. The laminated sheet heater with lead wire according to claim 3, wherein the lead terminal portion and the heater terminal portion are placed in the inside of the film void part.

5. The laminated sheet heater with lead wire according to claim 3, wherein
   the laminated sheet heater includes at least one of a first metal sheet laminated on an outer surface of the first insulating resin film and a second metal sheet laminated on an outer surface of the second insulating resin film,
   at least one of the first metal sheet and the second metal sheet is provided with a metal-sheet void part defined by one of a metal-sheet through hole formed through the first or second metal sheet and a metal-sheet recess formed inward in the planar direction of the laminated sheet heater, and the metal-sheet void part being configured to be continuous with the film void part so that the lead wire is inserted through the metal-sheet void part, and
   a metal-sheet corner portion formed between the outer surface of the first or second metal sheet and an inner peripheral surface defining the metal-sheet void part is covered by a protective member having a smooth outer surface.

6. The laminated sheet heater with lead wire according to claim 3, wherein
   at least part of a crimp-connection part in which the heater terminal portion and the lead terminal portion are crimp-connected to each other by the crimping member is placed in the inside of the film void part.

7. A laminated sheet heater with lead wire comprising:
   a first insulating resin film;
   a second insulating resin film;
   a heater element interposed between an inner surface of the first insulating resin film and an inner surface of the second insulating resin film;

a film void part defined by one of a film through hole formed through at least one of the first and second insulating resin films and a film recess formed inward in at least one of the first and second insulating resin films in a planar direction of the laminated sheet heater, wherein the heater element includes a heater terminal portion connectable to the lead wire through which electric current can be conducted to the heater element, the heater terminal portion being formed protruding into the film void part in the planar direction, the lead wire including a lead core wire that is electrically connected to the heater element through the heater terminal portion, the lead core wire of the lead wire includes a lead terminal portion that is crimp-connected to the heater terminal portion by a crimping member so that the lead terminal portion is in close contact with a surface of the heater terminal portion in the inside of the film void part in the planar direction, the laminated sheet heater includes at least one of a first metal sheet laminated on an outer surface of the first insulating resin film and a second metal sheet laminated on an outer surface of the second insulating resin film, and at least one of the first metal sheet and the second metal sheet is provided with a metal-sheet void part defined by one of a metal-sheet through hole formed through the first or second metal sheet and a metal-sheet recess formed inward in the planar direction of the laminated sheet heater, and the metal-sheet void part being configured to be continuous with the film void part so that the lead wire is inserted through the metal-sheet void part; and a metal-sheet corner portion formed between the outer surface of the first or second metal sheet and an inner peripheral surface defining the metal-sheet void part is covered by a protective member having a smooth outer surface.

8. The laminated sheet heater with lead wire according to claim 3, wherein at least part of the lead wire is fixed to an outermost surface of the laminated sheet heater.

9. The laminated sheet heater with lead wire according to claim 8, wherein at least part of the lead wire is fixed to the outermost surface of the laminated sheet heater by a fixing member, and the fixing member covers the film void part together with a crimp-connection part in which the heater terminal portion and the lead terminal portion are crimp-connected to each other by the crimping member, from above the outermost surface of the laminated sheet heater.

10. The laminated sheet heater with lead wire according to claim 7, wherein at least part of the lead wire is fixed to the outermost surface of the laminated sheet heater by a fixing member, and the fixing member covers the film void part and the metal-sheet void part together with a crimp-connection part in which the heater terminal portion and the lead terminal portion are crimp-connected to each other by the crimping member, from above the outermost surface of the laminated sheet heater.

11. A battery structure with heater comprising:
a battery structure that includes a power generating element and has a surface to be heated; and
a heater for heating the surface to be heated to heat the power generating element,
wherein the heater is the laminated sheet heater according to claim 1.

12. A battery structure with heater comprising:
a battery structure that includes a power generating element and has a surface to be heated; and
a heater for heating the surface to be heated to heat the power generating element,
wherein the heater is the laminated sheet heater with lead wire according to claim 3.

13. A heater unit comprising:
a heater; and
a holding member that holds the heater;
the heater unit being arranged to heat the battery structure to heat the power generating element,
wherein the heater is the laminated sheet heater according to claim 1, and
the holding member is configured to attach the heater unit to the battery structure.

14. A heater unit comprising:
a heater; and
a holding member that holds the heater;
the heater unit being arranged to heat the battery structure to heat the power generating element,
wherein the heater is the laminated sheet heater with lead wire according to claim 3, and
the holding member is configured to attach the heater unit to the battery structure.

15. The laminated sheet heater with lead wire according to claim 7, wherein
at least part of a crimp-connection part in which the heater terminal portion and the lead terminal portion are crimp-connected to each other by the crimping member is placed in the inside of at least one of the film void part and the metal-sheet void part.

16. A battery structure with heater comprising:
a battery structure that includes a power generating element and has a surface to be heated; and
a heater for heating the surface to be heated to heat the power generating element,
wherein the heater is the laminated sheet heater with lead wire according to claim 7.

17. A heater unit comprising:
a heater; and
a holding member that holds the heater;
the heater unit being arranged to heat the battery structure to heat the power generating element,
wherein the heater is the laminated sheet heater with lead wire according to claim 7, and
the holding member is configured to attach the heater unit to the battery structure.

* * * * *

UNITED STATES PATENT AND TRADEMARK OFFICE
CERTIFICATE OF CORRECTION

PATENT NO.         : 7,964,827 B2
APPLICATION NO.    : 12/007832
DATED              : June 21, 2011
INVENTOR(S)        : Masahiko Suzuki et al.

It is certified that error appears in the above-identified patent and that said Letters Patent is hereby corrected as shown below:

On the Title Page, item (73) Assignee:

change: "Panasonic Corporation Co., Ltd.,
       Kosai-shi (JP)"

to: --PANASONIC EV ENERGY CO., LTD.,
    Kosai-shi (JP)--

Signed and Sealed this
Thirteenth Day of September, 2011

David J. Kappos
*Director of the United States Patent and Trademark Office*